Patented Oct. 25, 1932

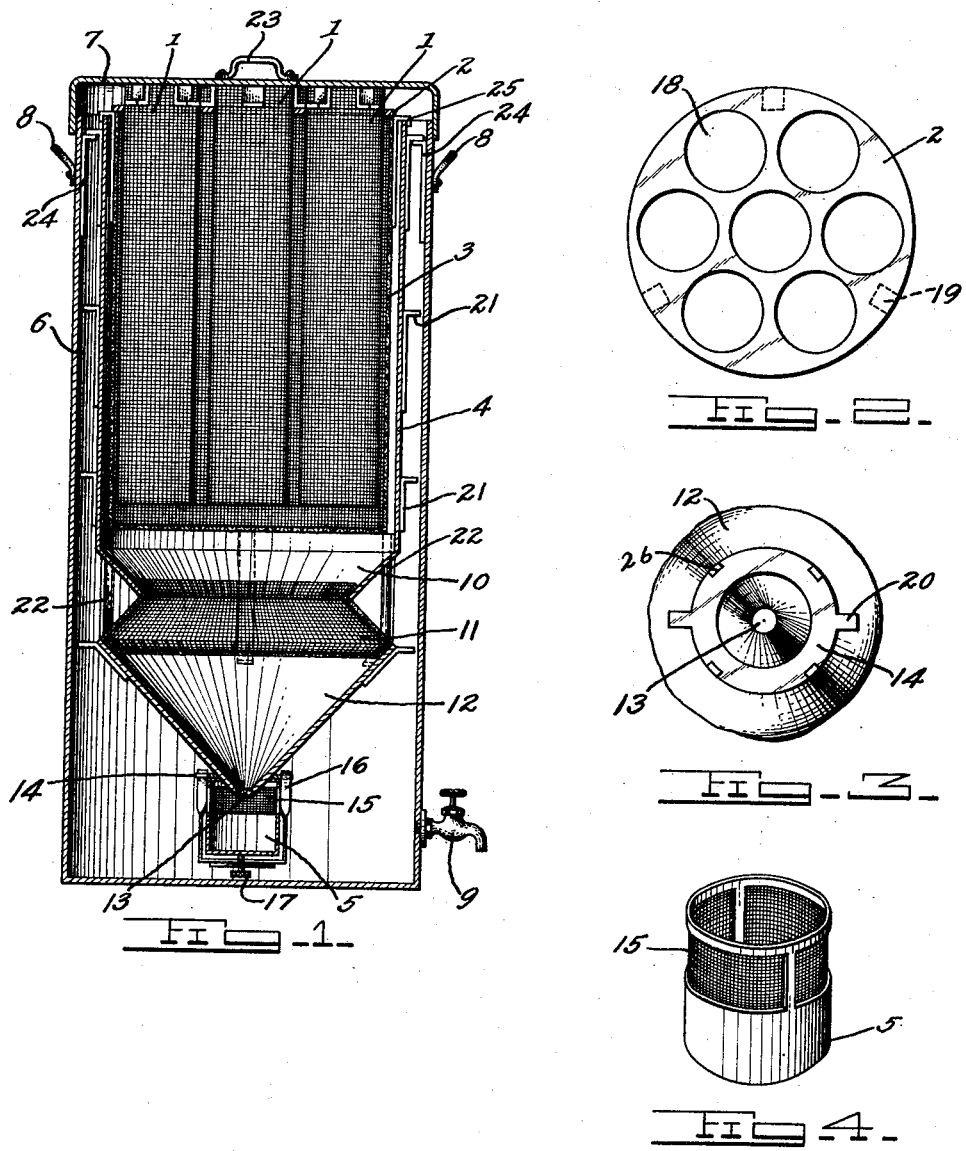

1,884,989

UNITED STATES PATENT OFFICE

FOSTER H. BENJAMIN, OF WASHINGTON, DISTRICT OF COLUMBIA, DEDICATED TO THE FREE USE OF THE PUBLIC

PROCESS FOR EXTRACTING ORGANISMS FROM ORGANIC OR INORGANIC SUBSTANCES

Application filed December 3, 1931. Serial No. 578,682.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described, if patented, may be manufactured and used by or for the Government, for governmental purposes without the payment to me of any royalty thereon.

I hereby dedicate the invention herein described to the free use of the public to take effect upon the granting of a patent to me.

This invention relates to the process of extracting insects and other small organisms from fruit, vegetables or other organic or inorganic substances by means of a solution of formaldehyde or other repellant, preservative or preservative repellant for motile forms, or by buoyancy for non-motile forms.

In extracting living and motile insects and other small organisms from their host or habitat by means of a solution of formaldehyde or of some other insect repellant, preservative or preservative repellant, the process depends upon negative chemotropisms, causing motile organisms to desert their host or habitat when exposed to the influence of the repellant. In extracting non-motile organisms such as for example insect eggs, dead insects etc., the process depends upon the buoyancy of such organisms when immersed in fluids. A 2% solution of formaldehyde is effective in the process but other concentrations may be successfully used.

This process may be carried out in any container such as for examples a tank, can, bucket, jar or dish and the insects or other organisms extracted may be collected for examination or identification by picking them out of the fluid, by straining the fluid, by the use of a centrifuge or by other effective means.

The aggrandizement or collection of the insects or of other organisms which are extracted by the use of the above described fluid is greatly facilitated by the use of the device hereinafter described which places these organisms in a bottle or jar and at the same time eliminating the larger percentage of the host or habitat.

The process is effectively performed by the use of the device illustrated in the accompanying drawing in which—

Figure 1 is a vertical section of the entire device; Figure 2 is a plan view of the hanger for the containers for host or habitat; Figure 3 is a view of the lower funnel-like part of the apparatus showing plate against which the bottle or jar for the collection or aggrandizement of the organisms is fastened; Figure 4 represents one style of such a bottle or jar in which the extracted organisms are deposited.

Similar numbers refer to similar parts throughout the several views.

Broadly speaking the apparatus is composed of a plurality of containers so shaped and of sizes as to permit the suspension of each, except the largest container, in the container next largest to it in size and providing a space between the walls of the various containers. These containers are composed of sheet metal and open mesh material as hereinafter more particularly described.

Host or habitat containers (or single container) 1 1 1 are (is) placed in the hanger 2 (see Figs. 1 and 2), the hanger 2 resting on the top of a container screen 3. The unit so composed is placed in a container 4 to the bottom of which is affixed, in some easily detachable way, the bottle or jar 5 (see Figs. 1 and 4). The unit thus formed is placed in a master can or tank 6.

The containers 1 1 1 are made of mesh wire or other porous or openwork material allowing free ingress and egress of fluids, insects and other small objects, yet retaining the bulk of the host or habitat. These containers are of such a size as to permit their suspension through openings in hanger 2 and are equipped with means, at the top, to retain them in a suspended position.

Container screen 3 is made of mesh or of porous or openwork material allowing the free ingress and egress of fluids, insects and other small organisms, yet retaining much of the trash which has escaped from the containers 1 1 1. This container screen 3 is not absolutely essential and may at times be eliminated, depending upon the nature of the aforementioned host or habitat. This container is of a size sufficient to permit the suspension of the containers 1 1 1 within it and is equipped with suitable means 25, at its top, to hold it in suspension when placed in a somewhat larger container 4.

Container 4, composed of sheet metal and mesh wire is tapered by a part 10 which is funnel-like below the included containers 1 1 1 and container screen 3 (when screen 3 is used) and thence is broadened by a part 11, similar in shape to an inverted funnel which is composed largely of screen or gauze or mesh coarse enough for the ingress or egress of fluids and solutes, yet fine enough to prevent egress of the extracted organisms. The container 4 is thence tapered by a funnel-like part 12 to a terminal opening 13 above which, on the outside of this funnel-like tapering portion is affixed a plate 14 for the abutment of the bottle or jar 5 (see Figs. 1 and 4), and so that the aforementioned terminal opening will be inside of the bottle or jar when the latter is clamped or otherwise fastened into place by any suitable means. The container 4, if desired, may be equipped with brackets 21 along its distal sides, spaced in such a way as to permit its suspension at various heights in the master container 6. This container may be strengthened by braces 22, and, with the exception of the inverted funnel-like part 11, is composed of sheet metal.

The actual construction of the bottle or jar 5 (see Fig. 4) which serves as a reservoir of a small quantity of the extracting fluid and the extracted organisms, is of small moment. I prefer that this feature of my invention possesses lateral openings with inserts of screen or gauze 15 of the approximate mesh of that used on the inverted funnel-like part 11 of container 4, thus allowing easy escape of fluids and solutes from the lower funnel-like part 12 of container 4, but retaining the organisms the operator may desire to aggrandize. The actual method of fastening or holding this bottle or jar tight against the plate 14 affixed to the outside of container 4 is of small moment. I prefer that this fastening be some simple clamp 16 and thumb-screw 17 arrangement as illustrated in Fig. 1, in order to be strong, yet to insure rapidity of removal of said bottle or jar. The hanger 2 (Fig. 2), is a circular metal disc of a size sufficient to rest on the top of the container 3 and small enough to fit inside container 4. This disc possesses a sufficient number of openings 18, to permit the insertion, therein, of containers 1 1 1. The hanger may be equipped with guides 19 to prevent slipping from side to side.

The plate 14, as disclosed in Fig. 3, may be equipped with lugs 20 to facilitate clamping, when the form of fastening 16, 17 disclosed is used. The lugs 26 may be employed to hold a gasket in place, if one is used to prevent the escape of organisms.

The master can or tank 6 may be made of sheet metal or any water tight material and should be in sufficient size to permit the suspension therein of container 4 equipped with jar 5. This master can may be provided with a faucet or drain 9 as an aid in emptying the can and with convenient handles 8 8 attached to its sides. It is also equipped with a cover 7 provided with a handle 23. Supporting cleats 24 are also rigidly affixed to the inner surface of the master can and so placed as to engage with the brackets 21 on container 4.

To operate—the machine is assembled as illustrated in Fig. 1 with the host or habitat material in containers 1 1 1; the aforementioned solution is put into the machine, the quantity used being sufficient to inundate or immerse the host or habitat material. The cover 7 may be placed on the master can or tank 6 to prevent contamination or the escape of noxious gases if this is desired by the operator. The device, together with the contained extracting fluid and the material from which extractions of organisms are progressing are allowed to remain intact for a period of time. In actual tests I have found that approximately over 90% of animal (mostly insect) organisms were removed from their hosts within less than 45 minutes and most of the remaining organisms within an additional 15 minutes. If the extracting fluid be a preservative such as a solution of formaldehyde the machine does not need to be emptied of the extracted organisms except at and/or for the convenience of the operator. After sufficient time has elapsed, as indicated above, the containers 1 1 1 are removed, thus removing the bulk of the host or habitat but allowing the extracted organisms to remain in the extracting solution. Container screen 3 (if this screen has been used) is removed, thus removing most of the trash of the host or habitat which has happened to escape from containers 1 1 1 but allowing the extracted organisms to remain in the extracting solution. Container 4 is then slowly removed from the master can or container 6, the extracting fluid escaping from the container 4 into the master container 6 through the screen or gauze of container 4 and/or through the similar screen or gauze of the bottle or jar 5; but as the extracting fluid escapes into container 6 the extracted organisms, together with a small quantity of the extracting fluid, are consolidated into the bottle or jar 5. The pitch of the screen or gauze of container 4 makes this screen or gauze practically self-cleaning as the container 4 is being lifted from the container 6. The extracted organisms are obtained from the bottle or jar 5 after the removal of this bottle or jar from container 4.

Having fully described my discovery I claim as my invention;

An apparatus for extracting organisms from their host or habitat, comprising a water-tight master container, a container slightly smaller but of the same general shape as the master container and suspended therein, composed of sheet metal and open mesh material, its lower portion tapering to an aperture, means to suspend said smaller container in the master container, a receptacle made of sheet metal and open mesh material removably attached to the lower end of said smaller container, means to removably attach the receptacle to said smaller container, a container screen of the same general shape of the master container, suspended within the said smaller container, means to so suspend the container screen, a hanger resting upon the top of said container screen and having a plurality of openings, host or habitat containers suspended through the openings in said hanger and means at the top of the host or habitat containers to hold them in a suspended position.

FOSTER H. BENJAMIN.